Aug. 4, 1959 E. HOFFMEISTER 2,898,119
COLLET FOR DENTAL PURPOSES
Filed April 23, 1956
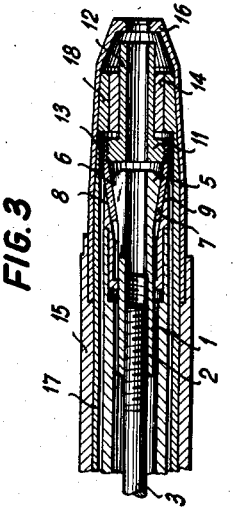
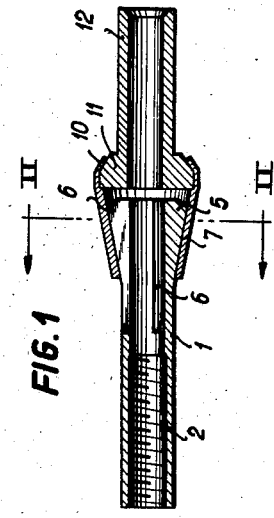
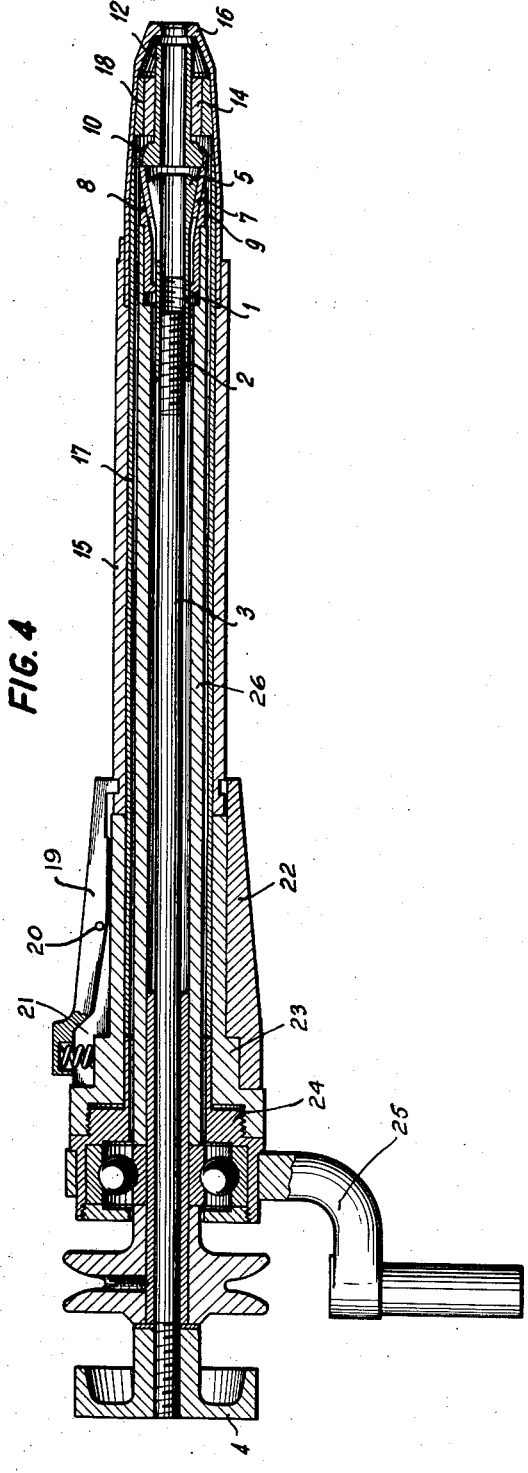

United States Patent Office 2,898,119
Patented Aug. 4, 1959

2,898,119

COLLET FOR DENTAL PURPOSES

Erich Hoffmeister, Biberach-Riss, Germany

Application April 23, 1956, Serial No. 580,105

Claims priority, application Germany May 4, 1955

4 Claims. (Cl. 279—51)

This invention relates to Doriot handpieces for dental purposes.

In Doriot handpieces the collet arranged at the front end of the driving shaft is clamped by means of a clamping rod which is arranged inside the spindle sleeve and is provided with a handle at its rear end projecting from the handpiece. With such handpieces, when the collet has to be cleaned or replaced by a new collet, the spindle sleeve which is arranged on the inside of the handpiece, has to be unscrewed and withdrawn before the collet can be removed. Since practically the whole handpiece has to be dismantled in order to do this, this operation requires a great deal of time.

An object of the invention is to obviate these disadvantages so that the collet can easily be interchanged.

According to the invention this is achieved by providing at the front end of the spindle sleeve a forwardly open conical housing or opening which is supported on a conical sleeve within which a conical head of the collet is arranged, the front end of the conical sleeve being connected to a hollow shaft which is intended to receive the shank of the tool and which is mounted in a bearing sleeve.

The arrangement is such that the collet is no longer surrounded by the spindle sleeve as hitherto, but is inserted from the front into the open front end of the said spindle sleeve and is drawn tight by means of a clamping rod, into the conical housing of the spindle sleeve, the said rod extending through the said spindle sleeve and being provided with a handle. The tip of the spindle sleeve with the collet is accessible after removal of the handle tube of the handpiece and after a bearing sleeve normally located within the handle tube, has been unscrewed.

The front end of the conical sleeve may be screwed, onto a collar arranged at the rear end of the hollow shaft adapted to receive the shank of a tool to be fixed to the handpiece, or the conical sleeve may be connected to said collar by a flanged portion on said conical sleeve.

The hollow shaft for carrying the tool shank may be mounted in a wear-resistant bearing which is arranged at the tip of the bearing sleeve and which is made of sapphire or hard metal.

Such bearing arrangement provides for the centering and support of the spindle sleeve with the collet. Moreover, the arrangement of the hollow shaft with its bearing in front of the collet also makes it possible to keep the diameter of the bearing small, as required by the technical development of high rotational speeds.

For a better understanding of the invention, the same will now be described, by way of example, with reference to the accompanying drawings, in which:

Figure 1 is a longitudinal sectional view of a collet and associated parts for a Doriot handpiece according to one embodiment, Figure 2 is a cross-sectional view taken along the line II—II of Figure 1, Figure 3 is a longitudinal sectional view of the front part of a Doriot handpiece according to another embodiment, and Figure 4 is a longitudinal sectional view of a Doriot handpiece in which is inserted a collet according to Figure 1.

In Figure 4 there is shown a Doriot handpiece having a handle-tube 15 removably secured by a locking hook 19, which is at 20 pivotally arranged in a slot 21 of a tubular body 22. The tubular body is secured to a further tubular body 23, which latter is threadably engaged with the part 24 of the frame element 25. A bearing sleeve 17, soldered at its rear end with the part 24, extends co-axially through the handle-tube 15, and within said bearing sleeve there is arranged a rotatable drive spindle 26 which is provided with a spindle sleeve 9 the front end of which is formed with a forwardly opening internal cone-shaped housing 8. A clamping rod 3 extending through the drive spindle 26, is connected at its front end to a collet 1 by means of a screw joint 2, the clamping rod being provided at its rear end which projects from the handpiece, with a hand-knob 4 for rotating the clamping rod during a clamping operation, to move the collet into and from clamping engagement with a tool. The collet 1 is slidingly engaged in the open front end portion of the drive spindle and spindle sleeve, the collet having at its forward end a conical head 5 formed with longitudinal slots 6, as shown more clearly in Figures 1 and 2, the head being slidable in a similarly cone-shaped sleeve 7 which, in its assembled or clamped position, is engaged and centered in the conical portion 8 of the sleeve 9.

In the embodiment illustrated in Figures 1, 2 and 4 the conical sleeve 7 has, at its front end, a flanged portion 10 which engages about a collar 11 of a hollow shaft 12 adapted to receive the shank of a tool to be secured to the collet.

The embodiment illustrated in Figure 3 is similar to that of Figures 1, 2 and 4, but in Figure 3 the conical sleeve 7 has, at its front end, an internally screw-threaded flange 13 which engages an externally threaded collar 11 of the hollow shaft 12.

In both embodiments, the hollow shaft 12 runs in a wear-resistant bearing 14, which is preferably made of sapphire or hard metal and which, as will be seen from Figures 3 and 4, is arranged in the tip portion 18 of the bearing sleeve 17 enclosed by a hood 16 secured to the handle tube 15.

In each embodiment, the arrangement is such that by rotating the clamping rod 3 to draw the collet rearwardly, the conical head 5 of the collet together with the conical sleeve 7, is drawn into the internal conical portion 8 of the spindle sleeve 9, so that the collet is brought into tight clamping engagement with the shank of the tool applied to the handpiece.

Since the collet is not completely surrounded by, or enclosed within, the spindle sleeve but is merely inserted into the open front end of the spindle sleeve, the collet can readily be removed. For this purpose, it is necessary merely to release the locking hook 19 to permit removal of the handle-tube 15, and the end hood 16, whereafter the bearing sleeve 17 with the bearing 14 and the parts 24, 23 and 22 can be unscrewed. The clamping rod 3 is then screwed out of the rear end of the collet, whereupon the unit comprising the conical sleeve 7, collet 1 and hollow shaft 12 can easily be withdrawn from the front of the spindle sleeve 9.

What is claimed is:

1. A handpiece for dental purposes comprising a removable bearing sleeve including a bearing, a drive shaft rotatably mounted in said handpiece, a spindle sleeve rotatable with said drive shaft and having an internal generally conical opening, a removable collet arranged in said spindle sleeve, a generally conical head on said collet located in the opening of said spindle sleeve, a hollow shaft rotatably mounted in the bearing of said bearing sleeve in front of the collet for accommodating the shank of a tool to be engaged by said collet, a generally conical sleeve embracing the head of said collet and connected to said hollow shaft, said generally conical sleeve extending into the opening of the spindle sleeve to support said spindle sleeve, and a clamping rod arranged within the spindle sleeve and operatively connected to said collet, said clamping rod having a portion projecting from said handpiece and including handle means for operation of the clamping rod to move the collet into and from clamping engagement with a tool.

2. A handpiece for dental purposes according to claim 1, comprising a collar on said hollow shaft and wherein said conical sleeve includes a flanged portion for engaging the collar on said hollow shaft.

3. A handpiece for dental purposes according to claim 1, comprising a collar on said hollow shaft and wherein said conical sleeve includes a threaded part for engaging the collar on said hollow shaft.

4. A handpiece for dental purposes according to claim 3, wherein said hollow shaft is mounted in the bearing of said bearing sleeve, the bearing being a wear-resistant member.

References Cited in the file of this patent

UNITED STATES PATENTS

| | | |
|---|---|---|
| 599,275 | Webb | Feb. 15, 1898 |
| 810,782 | Mason | Jan. 23, 1906 |
| 1,160,805 | Wood | Nov. 16, 1915 |
| 1,265,606 | Busch | May 7, 1918 |
| 1,293,525 | Osborn | Feb. 4, 1919 |
| 1,391,906 | Porter | Sept. 27, 1921 |
| 1,835,961 | Pieper | Dec. 8, 1931 |